United States Patent
Zhang et al.

(10) Patent No.: US 10,699,496 B2
(45) Date of Patent: Jun. 30, 2020

(54) METHOD FOR PROCESSING DATA ON INTERNET OF VEHICLES, SERVER, AND TERMINAL

(71) Applicant: HUAWEI DEVICE CO., LTD., Dongquan (CN)

(72) Inventors: Di Zhang, Shenzhen (CN); Rui Yan, Shenzhen (CN); Tao Du, Shenzhen (CN); Yanfeng Sun, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 299 days.

(21) Appl. No.: 15/123,587

(22) PCT Filed: Mar. 5, 2014

(86) PCT No.: PCT/CN2014/072914
§ 371 (c)(1),
(2) Date: Sep. 2, 2016

(87) PCT Pub. No.: WO2015/131351
PCT Pub. Date: Sep. 11, 2015

(65) Prior Publication Data
US 2017/0076510 A1    Mar. 16, 2017

(51) Int. Cl.
*B60W 40/09* (2012.01)
*G09B 19/16* (2006.01)
(Continued)

(52) U.S. Cl.
CPC ............. *G07C 5/008* (2013.01); *B60W 40/09* (2013.01); *G06Q 40/08* (2013.01); *G06Q 50/30* (2013.01);
(Continued)

(58) Field of Classification Search
CPC ...... B60W 40/09; B60W 40/10; B60W 40/08; G08G 1/0112; G08G 1/0129; G07C 5/008
See application file for complete search history.

(56) References Cited

U.S. PATENT DOCUMENTS

| 7,715,961 B1 | 5/2010 | Kargupta |
| 8,095,261 B2 | 1/2012 | Howell et al. |

(Continued)

FOREIGN PATENT DOCUMENTS

| CN | 101436347 A | 5/2009 |
| CN | 101984630 A | 3/2011 |

(Continued)

OTHER PUBLICATIONS

Combined Chinese Office Action and Search Report dated Jun. 22, 2017 in Patent Application No. 2014800017903 (with English Translation of Category of Cited Documents).

(Continued)

*Primary Examiner* — Robert J Utama
(74) *Attorney, Agent, or Firm* — Oblon, McClelland, Maier & Neustadt, L.L.P.

(57) ABSTRACT

The present disclosure provides a method for processing data on Internet of Vehicles, a server, and a terminal. In a technical solution of the present disclosure, the server first acquires the historical travel data, and then performs training on the historical travel data to obtain the program script used to analyze the driving behavior of the user, and finally sends the program script to the terminal. The driving behavior of the user is dynamically analyzed according to the program script and the travel data, which resolves a problem that algorithm accuracy decreases because an algorithm is not updated in time, ensures accuracy of analyzing the driving behavior of the user, and further decreases additional costs brought by updating terminal firmware.

4 Claims, 3 Drawing Sheets

(51) Int. Cl.
*G07C 5/00* (2006.01)
*G06Q 40/08* (2012.01)
*G08G 1/01* (2006.01)
*G06Q 50/30* (2012.01)
*G07C 5/02* (2006.01)
*B60W 50/00* (2006.01)

(52) U.S. Cl.
CPC ............ *G07C 5/02* (2013.01); *G08G 1/0112* (2013.01); *G08G 1/0129* (2013.01); *G09B 19/167* (2013.01); *B60W 2050/0077* (2013.01)

(56) References Cited

U.S. PATENT DOCUMENTS

| | | | | |
|---|---|---|---|---|
| 8,996,234 | B1* | 3/2015 | Tamari | G07C 5/0808 701/123 |
| 9,081,650 | B1* | 7/2015 | Brinkmann | G07C 5/008 |
| 9,141,582 | B1* | 9/2015 | Brinkmann | G06F 17/00 |
| 9,898,936 | B2* | 2/2018 | Stankoulov | G09B 19/167 |
| 2008/0255888 | A1* | 10/2008 | Berkobin | G06Q 40/08 705/4 |
| 2009/0210257 | A1* | 8/2009 | Chalfant | G06Q 40/08 705/4 |
| 2010/0017870 | A1 | 1/2010 | Kargupta | |
| 2010/0057335 | A1* | 3/2010 | Urhahne | B60R 16/0236 701/123 |
| 2010/0138244 | A1* | 6/2010 | Basir | G06Q 10/04 705/4 |
| 2010/0238009 | A1* | 9/2010 | Cook | G06Q 10/10 340/439 |
| 2010/0274440 | A1* | 10/2010 | Kim | G07C 5/008 701/31.4 |
| 2011/0077805 | A1 | 3/2011 | Hyde et al. | |
| 2011/0166773 | A1* | 7/2011 | Raz | B60W 40/09 701/123 |
| 2011/0258044 | A1 | 10/2011 | Kargupta | |
| 2011/0307188 | A1* | 12/2011 | Peng | G06Q 10/0639 702/33 |
| 2012/0202176 | A1* | 8/2012 | Dick | B60W 40/09 434/65 |
| 2012/0212353 | A1* | 8/2012 | Fung | B60K 28/06 340/905 |
| 2012/0221216 | A1* | 8/2012 | Chauncey | B60W 40/09 701/51 |
| 2012/0245758 | A1* | 9/2012 | Mizuta | B60W 30/182 701/1 |
| 2012/0283893 | A1* | 11/2012 | Lee | G07C 5/008 701/1 |
| 2013/0006674 | A1* | 1/2013 | Bowne | G06Q 10/0639 705/4 |
| 2013/0073112 | A1* | 3/2013 | Phelan | G06Q 40/00 701/1 |
| 2013/0164712 | A1* | 6/2013 | Hunt | B60W 40/09 434/65 |
| 2013/0226408 | A1* | 8/2013 | Fung | B60W 40/09 701/41 |
| 2014/0099607 | A1* | 4/2014 | Armitage | B60W 40/09 434/66 |
| 2014/0142805 | A1* | 5/2014 | Frye | B60R 16/023 701/36 |
| 2014/0272810 | A1* | 9/2014 | Fields | G09B 19/14 434/65 |
| 2014/0365029 | A1* | 12/2014 | Sugimoto | B60W 40/09 701/1 |
| 2015/0006132 | A1 | 1/2015 | Matsumura | |
| 2015/0112546 | A1* | 4/2015 | Ochsendorf | B60W 50/14 701/33.4 |
| 2015/0149069 | A1* | 5/2015 | Kinoshita | G01C 21/26 701/400 |
| 2016/0046298 | A1* | 2/2016 | DeRuyck | B60W 40/09 340/576 |
| 2017/0297583 | A1* | 10/2017 | Osumi | B60W 40/09 |

FOREIGN PATENT DOCUMENTS

| | | |
|---|---|---|
| CN | 102044095 A | 5/2011 |
| CN | 102081859 A | 6/2011 |
| CN | 103208205 A | 7/2013 |
| CN | 10331065 A | 9/2013 |
| CN | 103413359 A | 11/2013 |
| JP | 2008296682 A | 12/2008 |
| JP | 2009073465 A | 4/2009 |
| JP | 2013149154 A | 8/2013 |

OTHER PUBLICATIONS

Office Action dated Sep. 5, 2017 in Japanese Patent Application No. 2016-555544 (wth English language translation).
Combined Chinese Office Action and Search Report dated Jan. 4, 2017 in Patent Application No. 201480001790.3 (with English Translation of Categories of Cited Documents).
Written Opinion dated Dec. 8, 2014 in PCT/CN2014/072914.
Yi Yu, et al., "Vehicle road side of the information collection and service platform solutions" Anhui Wantong Polytron Technologies Inc., 2011, pp. 123-126 (with English language translation).
International Search Report dated Dec. 8, 2014 in PCT/CN2014/072914 filed Mar. 5, 2014.

\* cited by examiner

FIG. 5

METHOD FOR PROCESSING DATA ON INTERNET OF VEHICLES, SERVER, AND TERMINAL

CROSS-REFERENCE TO RELATED APPLICATIONS

This application is a National Stage of International Application No. PCT/CN2014/072914, filed on Mar. 5, 2014, which is hereby incorporated by reference in its entirety.

TECHNICAL FIELD

The present disclosure relates to technologies of Internet of Vehicles, and in particular, to a method for processing data on Internet of Vehicles, a server, and a terminal.

BACKGROUND

An Internet of Vehicles system refers to implementing collection, storage, and sending of all working situations (static and dynamic data) of a vehicle by installing an on-board terminal device on a vehicle dashboard. The on-board terminal device is an important compositional part in the Internet of Vehicles system, and is responsible for collecting data on Internet of Vehicles, where the data on Internet of Vehicles specifically refers to information, such as a movement state and an oil consumption state of the vehicle, that is collected by using an on-board sensing device, such as an on-board diagnostic system (OBD for short) and an acceleration sensor. A development goal of the Internet of Vehicles is to implement extraction of various attribute information of all vehicles on an information network platform, and perform effective supervision on a running state of the vehicle and provide a comprehensive service according to different function requirements.

In the prior art, one solution is that a server collects travel data of a user, and analyzes a driving behavior of the user, and then sends an analysis result to a terminal. However, this solution can only be applied to a user who does not worry about privacy protection. Another solution is that an algorithm used to analyze a driving behavior of a user is permanently stored in a terminal, which effectively protects privacy of the user. However, due to a change in a travel area of the user, or a change of a user requirement, when the permanently stored algorithm needs to be updated or a new algorithm needs to be added, if terminal firmware is not updated in time, algorithm accuracy may be caused to decrease.

SUMMARY

Embodiments of the present disclosure provide a method for processing data on Internet of Vehicles, a server, and a terminal, so as to resolve a problem that algorithm accuracy decreases because a terminal device of an Internet of Vehicles system is not updated in time.

A first aspect of the present disclosure provides a method for processing data on Internet of Vehicles, where the method is applied to a server, and the method includes:
acquiring historical travel data;
performing training on the historical travel data to obtain a program script used to analyze a driving behavior of a user; and
sending the program script to a terminal.

In a first possible implementation manner of the first aspect, the performing training on the historical travel data to obtain a program script used to analyze a driving behavior of a user is specifically:
analyzing, according to a set service model, the historical travel data to obtain a data flow analysis function; and
generating the program script according to the data flow analysis function.

With reference to the first aspect or the first possible implementation manner of the first aspect, in a second possible implementation manner of the first aspect, the acquiring historical travel data specifically includes:
acquiring the historical travel data from a third-party data server; or
acquiring the historical travel data from the terminal; where
the historical travel data is travel data of a fixed period of time in which a vehicle travels.

With reference to the first aspect or any one of the first to the second possible implementation manners of the first aspect, in a third possible implementation manner of the first aspect, after the sending the program script to a terminal, the method further includes:
sending a standard used to analyze the driving behavior of the user to the terminal.

With reference to the first aspect or any one of the first to the third possible implementation manners of the first aspect, in a fourth possible implementation manner of the first aspect, after the sending the program script to a terminal, the method further includes:
receiving a request for updating the program script; and
updating the program script according to the request for updating the program script.

A second aspect of the present disclosure provides a method for processing data on internet of Vehicles, where the method is applied to a terminal, and the method includes:
receiving a program script that is used to analyze a driving behavior of a user and sent by a server;
acquiring travel data; and
analyzing the driving behavior of the user according to the program script and the travel data.

In a first possible implementation manner of the second aspect, the acquiring travel data includes:
acquiring the travel data from at least one of an on-board diagnostic system (OBD) module, a global positioning system (GPS), and an acceleration sensor; where
acquiring the travel data from the OBD module is specifically acquiring a vehicle speed and a rotational speed of an engine; or
acquiring the travel data from the GPS is specifically acquiring geographical location information; or
acquiring the travel data from the acceleration sensor is specifically acquiring an acceleration.

With reference to the second aspect or the first possible implementation manner of the second aspect, in a second possible implementation manner of the second aspect, before the analyzing the driving behavior of the user according to the program script and the travel data, the method further includes:
acquiring a standard that is used to analyze the driving behavior of the user and sent by the server; where
the analyzing the driving behavior of the user according to the program script and the travel data is specifically:
substituting the travel data into the program script, executing the program script, and generating a first value; and comparing the first value with the standard that is used to analyze the driving behavior of the user, and analyzing the driving behavior of the user; where the first value may be a variance or an average.

With reference to the second aspect or the first possible implementation manner of the second aspect, in a third possible implementation manner of the second aspect, after the analyzing the driving behavior of the user according to the program script and the travel data, the method further includes:

detecting, according to the acquired geographical location information, whether the geographical location information changes; and when it is detected that the geographical location information changes, requesting the server to update the program script.

With reference to the second aspect or any one of the first to the third possible implementation manners of the second aspect, in a fourth possible implementation manner of the second aspect, after the acquiring travel data, the method further includes:

collecting travel data of a fixed period of time in which a vehicle travels; and sending the travel data to the server.

A third aspect of the present disclosure provides a server, including:

a receiver, configured to acquire historical travel data;

a processor, configured to perform training on the historical travel data to obtain a program script used to analyze a driving behavior of a user; and a transmitter, configured to send, to a terminal, the program script generated by performing training by the processor.

In a first possible implementation manner of the third aspect, the processor is specifically configured to:

analyze, according to a set service model, the historical travel data to obtain a data flow analysis function; and generate the program script according to the data flow analysis function.

With reference to the third aspect or the first possible implementation manner of the third aspect, in a second possible implementation manner of the third aspect, the receiver is specifically configured to:

acquire the historical travel data from a third-party data server; or acquire the historical travel data from the terminal; where the historical travel data is travel data of a fixed period of time in which a vehicle travels.

With reference to the third aspect or any one of the first to the second possible implementation manners of the third aspect, in a third possible implementation manner of the third aspect, the transmitter is further configured to:

send a standard used to analyze driving the behavior of the user to the terminal.

With reference to the third aspect or any one of the first to the third possible implementation manners of the third aspect, in a fourth possible implementation manner of the third aspect, the receiver is further configured to:

receive a request for updating the program script.

With reference to the third aspect or any one of the first to the fourth possible implementation manners of the third aspect, in a fifth possible implementation manner of the third aspect, the processor is further configured to:

update the program script according to the request that is for updating the program script and received by the receiver.

A fourth aspect of the present disclosure provides a terminal, where the terminal includes:

a receiver, configured to: receive a program script that is used to analyze a driving behavior of a user and sent by a server, and acquire travel data; and a processor, configured to analyze the driving behavior of the user according to the program script received by the receiver and the acquired travel data.

In a first possible implementation manner of the fourth aspect, the receiver may be specifically at least one of an on-board diagnostic system (OBD) module, a global positioning system (GPS), and an acceleration sensor; where that the receiver is configured to acquire the travel data is specifically:

acquiring the travel data from the OBD module, which is specifically acquiring a vehicle speed and a rotational speed of an engine; or acquiring the travel data from the GPS, which is specifically acquiring geographical location information; or acquiring the travel data from the acceleration sensor, which is specifically acquiring acceleration.

With reference to the fourth aspect or the first possible implementation manner of the fourth aspect, in a second possible implementation manner of the fourth aspect, the receiver is further configured to:

acquire a standard that is used to analyze the driving behavior of the user and sent by the server.

With reference to the fourth aspect or any one of the first to the second possible implementation manners of the fourth aspect, in a third possible implementation manner of the fourth aspect, the processor is specifically configured to:

substitute the travel data into the program script, execute the program script, and generate a first value; and compare the first value with the standard that is used to analyze the driving behavior of the user and acquired by the receiver, and analyze the driving behavior of the user; where the first value may be a variance or an average.

With reference to the fourth aspect or the first possible implementation manner of the fourth aspect, in a fourth possible implementation manner of the fourth aspect, the processor is further configured to:

detect, according to the acquired geographical location information, whether the geographical location information changes; and when it is detected that the geographical location information changes, request the server to update the program script.

With reference to the fourth aspect or any one of the first to the fourth possible implementation manners of the fourth aspect, in a fifth possible implementation manner of the fourth aspect, the terminal further includes a transmitter; where the processor is further configured to collect travel data of a fixed period of time in which a vehicle travels; and the transmitter is configured to send the travel data to the server.

In the method for processing data on Internet of Vehicles, the terminal, and the system provided in the present disclosure, the server first acquires historical travel data, and then performs training on the historical travel data to obtain a program script used to analyze a driving behavior of a user, and finally sends the program script to the terminal. The driving behavior of the user is dynamically analyzed according to the program script and the travel data, which resolves a problem that algorithm accuracy decreases because an algorithm is not updated in time, and ensures accuracy of analyzing the driving behavior of the user.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by persons of ordinary skill in the art based on the embodiments of the present disclosure without creative efforts shall fall within the protection scope of the present disclosure.

Technologies described in this specification may be applied to various communications systems, for example, current 2G and 3G communications systems, Wi-Fi communications system, and a next-generation communications system, for example, a Global System for Mobile Communications (GSM for short), a Code Division Multiple Access (CDMA for short) system, a Time Division Multiple Access (TDMA for short) system, a Wideband Code Division Multiple Access (WCDMA for short) system, a Frequency Division Multiple Access (FDMA for short) system, an Orthogonal Frequency-Division Multiple Access (OFDMA for short) system, a single-carrier FDMA (SC-FDMA) system, a General Packet Radio Service (GPRS for short) system, a Long Term Evolution (LTE for short) system, and other communications systems.

At present, in order to provide a premium discount service for a user, an insurance company needs to analyze a driving behavior of the user. For example, when the user encounters a traffic accident and requires the insurance company to settle a claim, the insurance company may analyze the driving behavior of the user, where the driving behavior may be a danger index of a current road section, an acceleration of a vehicle, and whether the user performs an action of abrupt deceleration. When the insurance company learns, by viewing a terminal, that a danger index of a road section on which the user encounters an accident is rather large, the acceleration of the vehicle is relatively small, and there is an abrupt deceleration behavior, the insurance company may possibly conclude that it is due to a too dangerous road, and the user makes an effort to avoid the accident, and in this case, the user may obtain more compensation from the insurance company. However, when the insurance company learns, by viewing the terminal, that the danger index of the road section on which the user encounters the accident is rather small, the acceleration of the vehicle is relatively large, and there is no abrupt deceleration behavior, in this case, the user may obtain relatively small compensation, because most liabilities are possibly on the driving behavior of the user.

Currently, a program used to analyze a driving behavior of a user is permanently stored in a terminal when a vehicle is delivered from a factory. Because judgment standards are not all the same for different provinces and different countries, in this way, if a geographical location of the user changes, an inaccurate analysis result of the program may be caused, which consequently brings benefit losses to the user. In a method for processing data on Internet of Vehicles provided in embodiments of the present disclosure, a program script that is used to analyze a driving behavior of a user and is in a terminal device may be updated in real time, and therefore an analysis result is more accurate.

Figure 1:
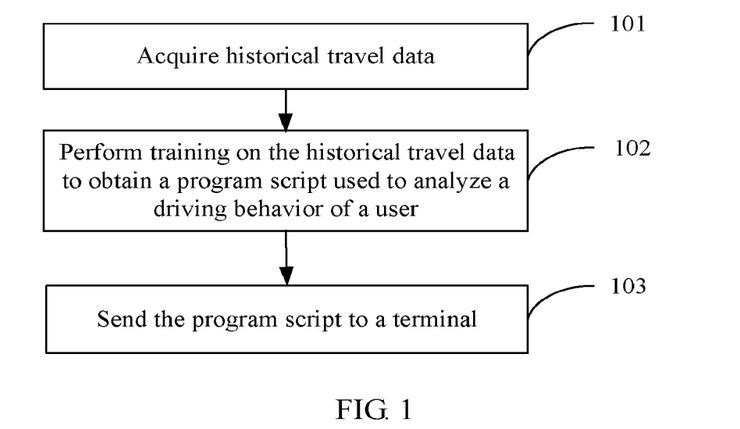
FIG. 1 is a flowchart of a method for processing data on Internet of Vehicles according to an embodiment of the present disclosure.

FIG. 1 is a flowchart of a method for processing data on Internet of Vehicles according to an embodiment of the present disclosure. The method provided in this embodiment of the present disclosure may be applied to a server, where the server may be a Trivial File Transfer Protocol (TFTP for short) server, a Dynamic Host Configuration Protocol (DHCP for short) server, or the like on a network side, and the present disclosure sets no limitation on a type of the server. The server of the present disclosure may be located in an equipment room. In addition, in this embodiment of the present disclosure, the involved terminal may be inserted into an OBD device with a specific interface inside a vehicle. As shown in FIG. 1, the method includes:

Step 101: Acquire historical travel data.

The historical travel data is travel data of a fixed period of time in which a vehicle travels.

The fixed period of time may be specifically one week, 10 days, one month, or the like, that is, the server may acquire travel data of one week in which the vehicle travels, or may acquire travel data of 10 days in which the vehicle travels, or may acquire travel data of one month in which the vehicle travels. The present disclosure sets no limitation on the fixed period of time.

Optionally, the server may acquire the historical travel data from a third-party data server.

First, the third-party data server acquires the historical travel data. Specifically, the third-party data server acquires the travel data that is in one fixed period of time and uploaded by the terminal. The terminal periodically uploads the travel data that is in one fixed period of time to the third-party data server.

After the terminal uploads the travel data that is in one fixed period of time to the third-party data server, the third-party data server creates a table that stores the travel data, and the third-party data server sends, to the server, the table that stores the travel data.

As shown in Table 1, Table 1 is historical travel data of the user in March, where the fixed period of time is one week, and the historical travel data is collected at a time interval of collecting travel data once a week. The travel data, including: a vehicle speed, an acceleration, geographical location information of the vehicle, and the like, of the vehicle is recorded in the table.

TABLE 1

Record table of historical travel data of a user in March

| | | Historical travel data | | |
|---|---|---|---|---|
| Time | Vehicle speed | Acceleration | ... | Geographical location information of the vehicle |
| Week 1 | | | | |
| Week 2 | | | | |
| Week 3 | | | | |
| Week 4 | | | | |

Optionally, the server may also acquire the historical travel data from the terminal.

That the server acquires the historical travel data from the terminal may be specifically that the terminal periodically uploads the travel data to the server remotely by using a GPRS function and according to a fixed period of time.

The server creates a table that stores the historical travel data, and travel data of the vehicle in one fixed period of time is recorded in the table, where the travel data includes a vehicle speed, an acceleration, geographical location information of the vehicle, and the like. After the terminal uploads the travel data, the server stores the travel data in a corresponding table according to a corresponding type. A table that stores the travel data and is created on a server side may be the same as, or may be different from a table that stores the travel data and is created by the third-party data server.

As shown in Table 2, Table 2 is historical travel data of the user in the first week of March, where the fixed period of time is one day, and the historical travel data is collected at a time interval of collecting travel data once a day.

TABLE 2

Record table of historical travel data of a user in the first week of March

| | | Historical travel data | | |
|---|---|---|---|---|
| Time | Vehicle speed | Acceleration | ... | Geographical location information of the vehicle |
| Day 1 | | | | |
| Day 2 | | | | |
| ... | | | | |
| Day 7 | | | | |

Step 102: Perform training on the historical travel data to obtain a program script used to analyze a driving behavior of a user.

The server may perform training on the historical travel data collected from the third-party data server or the terminal, to obtain the program script used to analyze the driving behavior of the user. The driving behavior of the user may be a danger index of a road section on which the user drives, a driving distance of the user, oil consumption statistics for driving of the user, geographical location information for driving of the user, or the like. The present disclosure sets no limitation on the driving behavior of the user.

Optionally, the server first analyzes, according to a set service model, the historical travel data to obtain a data flow analysis function, and then analyzes the data flow analysis function to generate the program script.

Specifically, the server performs, according to the set service model, training on the historical travel data acquired from the third-party data server or the terminal, to generate the data flow analysis function, and then analyzes the generated data flow analysis function to generate the program script, where the program script is used to analyze the driving behavior of the user.

For example, on a two-dimensional plane of (x, y), historical data (x, y) of N values is collected, where the historical data represents N dots on the two-dimensional plane. In this case, a model is defined, and the model is defined as a circle; and it is hoped that under this model, 90% of the dots may be included in the circle. In this case, a radius of the model needs to be determined according to the historical data, that is, analysis is performed according to the historical data to obtain a value of the radius of the model, upon which 90% of the dots may fall within the circle. The radius is not unique. Under a premise of ensuring that 90% of the dots fall within the circle, a model with a minimum radius is used as an optimal model, and then a radius of the obtained model and a formula of the model are written into the script. This process is a training process.

The service model may be specifically a model defined according to a service requirement, such as a road danger index evaluation model, an accident risk model, and an oil consumption estimation model. The present disclosure sets no limitation on the service model. Multiple pieces of historical travel data may be used for training a same service model.

Step 103: Send the program script to a terminal.

The server sends, to the terminal, the program script generated by means of training, so that the terminal analyzes the driving behavior of the user according to the program script.

Further, before sending the program script to the terminal, the server may encrypt the program script.

Specifically, to ensure security of a transmission process of the program script, and prevent other servers from forging an identity and sending a malicious program script to the terminal, before sending, to the terminal, the program script generated by performing training on the historical travel data, the server may encrypt the program script by using a preset private key, so as to ensure that the terminal can receive a secure program script. After receiving an encrypted program script, the terminal may try to decrypt the encrypted program script by using a preset public key. If decryption is successful, it is proved that the program script is a secure program script, and may be used to analyze the driving behavior of the user. If the decryption fails, it is proved that the program script is an insecure program script and is abandoned.

When the program script is encrypted, an elliptic curve algorithm featuring relatively small memory resource consumption and an easy algorithm may be used, or another relatively complex encryption algorithm may be used. The present disclosure sets no limitation on an encryption algorithm.

Optionally, after sending the program script to the terminal, the server may further send a standard used to analyze the driving behavior of the user to the terminal.

Specifically, the server may further send the standard used to analyze the driving behavior of the user to the terminal, where the standard is used to analyze whether a driving behavior of the user in a period of time belongs to normal driving.

Specifically, the server calculates an average of acquired historical travel data that is in a same period of time, where this average is a standard used to analyze a user driving behavior that is in the same period of time.

For example, the server analyzes, according to collected historical travel data in a period of time, an average of vehicle speeds that are in this period of time, where the average of the vehicle speeds is a standard value of a vehicle speed. The standard value of the vehicle speed in this period of time that is sent by the server to the terminal is 70 (km/h). The terminal is an OBD device that is inserted into a specific interface inside the vehicle, where the OBD device includes a screen. An average vehicle speed that is in the same period of time and analyzed by the terminal is 80 (km/h), and that the vehicle speed exceeds the average by 14.3% may be displayed on the terminal. If a traffic accident occurs, an insurance company may provide a more reasonable premium discount service for the user according to this percentage.

Optionally, after sending the program script to the terminal, the server receives a request for updating the program script; and updates the program script according to the request for updating the program script.

Specifically, because a method used for analyzing the driving behavior of the user is different in different countries and different provinces, program scripts used to analyze the driving behavior of the user are also different. The terminal may detect, according to geographical location information acquired by a global positioning system (Global Positioning System, GPS for short), whether the geographical location information of the user changes. When detecting a change in a geographic location of the user, the terminal may actively request the server to update a current program script used to analyze the driving behavior of the user. After receiving the request, which is sent by the terminal, for updating the program script, the server may first acquire historical travel data of a current geographical location of the user from the third-party data server or the terminal, then analyzes the acquired historical travel data, generates a program script used to analyze the driving behavior of the user, and sends the program script to the terminal. The terminal may update an existing program script according to the received program script, so that the program script is applicable to the current geographical location, and the terminal analyzes the driving behavior of the user more accurately. The updating a current program script used to analyze the driving behavior of the user may be modifying the existing program script, or may be adding a new program script.

In the method for processing data on Internet of Vehicles provided in this embodiment of the present disclosure, a server first acquires historical travel data, and then performs training on the historical travel data to obtain a program script used to analyze a driving behavior of a user, and finally sends the program script to a terminal. The driving behavior of the user is dynamically analyzed according to the program script and the travel data, which resolves a problem that algorithm accuracy decreases because an algorithm is not updated in time, ensures accuracy of analyzing the driving behavior of the user, and further decreases additional costs brought by updating terminal firmware.

Figure 2:
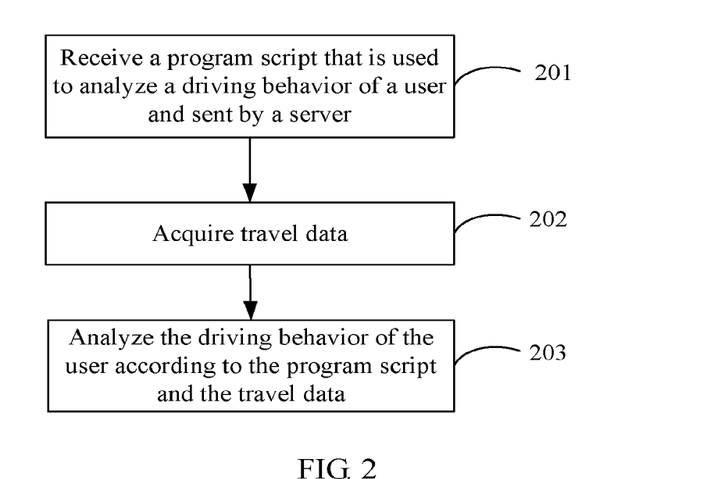
FIG. 2 is a flowchart of a method for processing data on Internet of Vehicles according to another embodiment of the present disclosure.

FIG. 2 is a flowchart of a method for processing data on Internet of Vehicles according to another embodiment of the present disclosure. The method provided in this embodiment of the present disclosure may be applied to a terminal, where the terminal may be an OBD device that is inserted in a specific interface inside a vehicle. As shown in FIG. 2, the method includes:

Step 201: Receive a program script that is used to analyze a driving behavior of a user and sent by a server.

The terminal receives the program script that is used to analyze the driving behavior of the user and sent by the server.

Further, after receiving the program script sent by the server, the terminal may decrypt the program script by using a preset public key. If decryption is successful, it is proved that the program script is a secure program script, and may be used to analyze the driving behavior of the user. If the decryption fails, it is proved that the program script is an insecure program script and is abandoned.

Further, the terminal may make one copy of the program script, encrypt code in the program script by using hardware encryption or a software encryption method such as obfuscated code encryption, and store the code that is in the program script to be used in next scheduling.

Step 202: Acquire travel data.

The terminal acquires the travel data used to analyze the driving behavior of the user.

Optionally, the terminal acquires the travel data from at least one of an OBD module, a GPS, and an acceleration sensor.

Specifically, a vehicle speed, a rotational speed of an engine, and the like are acquired from the OBD module, geographical location information is acquired from the GPS, and acceleration information is acquired from the acceleration sensor.

Step 203: Analyze the driving behavior of the user according to the program script and the travel data.

The terminal may analyze the driving behavior of the user according to the program script sent by the server and the collected travel data.

Optionally, before the terminal analyzes the driving behavior of the user according to the program script and the travel data, the terminal may further acquire a standard that is sent by the server and used to analyze the driving behavior of the user.

Specifically, the terminal substitutes the acquired travel data into the program script sent by the server, executes the program script, and generates a first value, and then compares the first value with the standard that is used to analyze the driving behavior of the user, where the first value may be a variance or an average.

For example, an average of danger indexes of different nodes in a road section may be used to represent a danger index of the road section. The terminal queries danger indexes of different nodes in a driving road section in a period of time from a local geographic information system (GIS for short) agent, by calculating an average of the danger indexes of different nodes of the road section, a road section danger index in a same period of time may be obtained, and then the road section danger index obtained by means of calculation is compared with a road section security index standard that is sent by the server and received by the terminal. For example, the road section danger index obtained by means of calculation is 80, and the received road security index standard sent by the server is 30. In this case, that the road security index standard is exceeded by 60% may be displayed on the terminal, that is, the road section at this moment is relatively dangerous. If a traffic accident occurs during the same period of time, the insurance company may also provide a more reasonable premium discount service for the user according to data such as a relative danger index of a road section, and whether the user has an acceleration behavior.

The GIS agent acquires the danger indexes of different nodes in the road section from a third-party road section information server. The third-party road section information server may set road nodes according to a preconfigured distance interval, and acquire a danger index of each road node.

Optionally, after analyzing the driving behavior of the user according to the program script and the travel data, the terminal detects the geographical location information; and when it is detected that the geographical location information changes, the terminal may request the server to update the program script.

Specifically, because a method used for analyzing the driving behavior of the user is different in different countries and different provinces, program scripts used to analyze the driving behavior of the user are also different. In one case, the terminal may detect, according to geographical location information acquired by the GPS, whether the geographical location information of the user changes. When the terminal detects a change in the geographical location information of the user, the terminal may actively request the server to update a current program script used to analyze the driving behavior of the user. When the terminal receives an updated program script, the terminal may update an existing program script according to the received program script, so that the program script is applicable to a current geographic location, and the terminal analyzes the driving behavior of the user more accurately. The updating a current program script used to analyze the driving behavior of the user may be modifying the existing program script, or may be adding a new program script.

Optionally, after analyzing the driving behavior of the user according to the program script and the travel data, the terminal collects travel data of a fixed period of time in which a vehicle travels, and sends the travel data to the server.

Specifically, if the user is willing to send travel data of the user to the server, the user may send the travel data that is in the fixed period of time to the server by using a GPRS function of the terminal, and store the travel data in a historical travel data recording table on the server side, to serve as historical travel data used by the server to help the user analyze the program script.

In the method for processing data on Internet of Vehicles provided in this embodiment of the present disclosure, a terminal first receives a program script that is sent by a server and used to analyze a driving behavior of a user, and then the terminal acquires travel data, and finally the terminal analyzes the driving behavior of the user according to the received program script and the acquired travel data. The driving behavior of the user is dynamically analyzed according to the program script and the travel data, which resolves a problem that algorithm accuracy decreases because an algorithm is not updated in time, ensures accuracy of analyzing the driving behavior of the user, and further decreases additional costs brought by updating terminal firmware.

Figure 3:
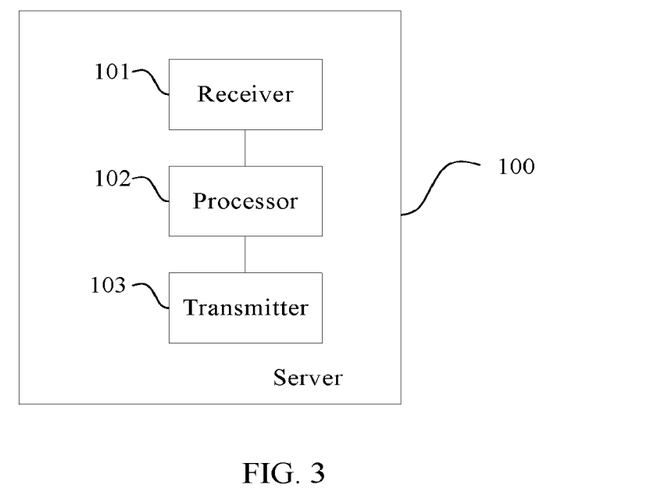
FIG. 3 is a schematic structural diagram of a server according to an embodiment of the present disclosure.

FIG. 3 is a schematic structural diagram of a server according an embodiment of the present disclosure. As shown in FIG. 3, a server 100 includes: a receiver 101, a processor 102, and a transmitter 103.

The receiver 101 is configured to acquire historical travel data.

The processor 102 is configured to perform training on the historical travel data that is acquired by the receiver 101, to obtain a program script used to analyze a driving behavior of a user.

The transmitter 103 is configured to send, to a terminal, the program script generated by performing training by the processor 102.

Optionally, the processor 102 is specifically configured to: analyze, according to a set service model, the historical travel data to obtain a data flow analysis function; and analyze the data flow analysis function to generate the program script.

Specifically, the processor 102 first performs training on, according to the set service model, the historical travel data to generate the data flow analysis function, and then analyzes the generated data flow analysis function to generate the program script, where the program script is used to analyze the driving behavior of the user.

The service model may be specifically a model defined according to a service requirement, such as a road danger index evaluation model, an accident risk model, an oil consumption estimation model. The present disclosure sets no limitation on the service model. Multiple pieces of historical travel data may be used for training a same service model.

Optionally, the receiver 101 is specifically configured to: acquire the historical travel data from a third-party data server; or acquire the historical travel data from the terminal, where the historical travel data is travel data of a fixed period of time in which a vehicle travels.

Specifically, the third-party data server acquires travel data that is in a fixed period of time and uploaded by the terminal. The terminal may periodically upload the travel data of a period of time to the third-party data server. After the terminal uploads the travel data of the fixed period of time to the third-party data server, the third-party data server creates a table that stores the travel data. For example, the historical travel data recording table is used to record the travel data that is of the terminal in a fixed period of time, where the travel data includes: a vehicle speed, an acceleration, geographical location information, and the like. After the terminal uploads the travel data, the third-party data server may store, according to a corresponding type, the travel data uploaded by the terminal in a corresponding historical travel data table. The third-party data server sends, to the server, the table that stores the travel data. As shown in Table 1, Table 1 is historical travel data of the user in March, where the fixed period of time is one week, and the historical travel data is collected at a time interval of collecting travel data once a week.

In another embodiment of the present disclosure, the terminal may periodically upload the travel data to the server remotely by using a GPRS function according to a fixed period of time. The server may create a table that stores the historical travel data, where the table records the travel data of the vehicle in a fixed period of time, and the travel data includes a vehicle speed, an acceleration, geographical location information of the vehicle, and the like. After the terminal uploads personal travel data, the server stores the travel data in a corresponding table according to a corresponding type. A table that stores the travel data and is created on a server side may be the same as, or may be different from a table that stores the travel data and is created by the third-party data server.

As shown in Table 2, Table 2 is historical travel data of the user in the first week of March, where the fixed period of time is one day, and the historical travel data is collected at a time interval of collecting travel data once a day.

Optionally, the transmitter 103 is further configured to send a standard that is used to analyze the driving behavior of the user to the terminal.

Specifically, the transmitter 103 may further send the standard that is used to analyze the driving behavior of the user to the terminal, where the standard is used to analyze whether a driving behavior of the user in a period of time belongs to normal driving. Specifically, the server calculates an average of acquired historical travel data that is in a same period of time, where this average is a standard used to analyze a driving behavior of the user in the same period of time.

Optionally, the receiver 101 is further configured to receive a request for updating the program script.

Optionally, the processor 102 is further configured to update the program script according to the request that is for updating the program script and received by the receiver.

Specifically, because a method used for analyzing the driving behavior of the user is different in different countries and different provinces, program scripts used to analyze the driving behavior of the user are also different. The terminal may detect, according to geographical location information acquired by the GPS, whether the geographical location information of the user changes. When the terminal detects a change in a geographical location of the user, the terminal may actively request the server to update a current program script used to analyze the driving behavior of the user. After the receiver 101 receives the request, which is sent by the terminal, for updating the program script, the processor 102 may first acquire historical travel data of the current geographical location of the user from the third-party data server or the terminal, and then analyzes the acquired historical travel data, generates a program script used to analyze the driving behavior of the user, and sends the program script to the terminal by using the transmitter 103. The terminal may update an existing program script according to the received program script, so that the program script is applicable to the current geographical location, and the terminal analyzes the driving behavior of the user more accurately. The updating a current program script used to analyze the driving behavior of the user may be modifying the existing program script, or may be adding a new program script.

Further, before sending, to the terminal, the program script generated by performing training by the processor 102, the transmitter 103 may encrypt the program script.

Specifically, to ensure security of a transmission process of the program script, and prevent other servers from forging an identity and sending a malicious program script to the terminal, before sending, to the terminal, a program script generated after performing training on the historical travel data, the transmitter 103 may encrypt the program script by using a preset private key, so as to ensure that the terminal can receive a secure program script. After receiving an encrypted program script, the terminal may try to decrypt the encrypted program script by using a preset public key. If decryption is successful, it is proved that the program script is a secure program script, and may be used to analyze the driving behavior of the user. If the decryption fails, it is proved that the program script is an insecure program script and is abandoned.

When the program script is encrypted, an elliptic curve algorithm featuring relatively small memory resource consumption and an easy algorithm may be used, or another relatively complex encryption algorithm may be used. The present disclosure sets no limitation on an encryption algorithm.

In the server provided in this embodiment of the present disclosure, the server first acquires historical travel data, and then performs training on the historical travel data to obtain a program script used to analyze a driving behavior of a user, and finally sends the program script to a terminal. The driving behavior of the user is dynamically analyzed according to the program script and the travel data, which resolves a problem that algorithm accuracy decreases because an algorithm is not updated in time, ensures accuracy of analyzing the driving behavior of the user, and further decreases additional costs brought by updating terminal firmware.

Figure 4:
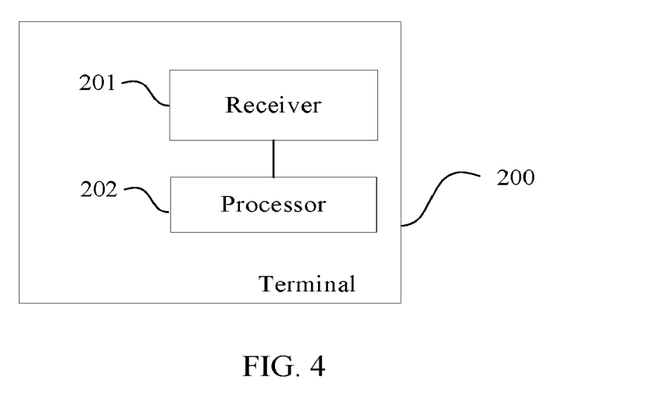
FIG. 4 is a schematic structural diagram of a terminal according to an embodiment of the present disclosure.

FIG. 4 is a schematic structural diagram of a terminal according to an embodiment of the present disclosure. As shown in FIG. 4, a terminal 200 includes: a receiver 201 and a processor 202.

The receiver 201 is configured to: receive a program script that is used to analyze a driving behavior of a user and sent by a server, and acquire travel data.

The processor 202 is configured to analyze the driving behavior of the user according to the program script and the travel data that are acquired by the receiver 201.

In another embodiment of the present disclosure, the receiver 201 in the terminal 200 may receive travel data acquired by an OBD device. The receiver 201 may be specifically a mobile communications module, for example, a GPRS communications module.

The OBD device is inserted into a specific interface of a vehicle, where the OBD device includes at least one of an on-board diagnostic system OBD module, a GPS, and an acceleration sensor. The OBD device acquires a vehicle speed, a rotational speed of an engine, and the like from the OBD module, acquires geographical location information from the GPS, and acquires an acceleration from the acceleration sensor. Therefore, the receiver 201 receives at least one piece of the following information: the vehicle speed and the rotational speed of the engine, the geographical location information, and the acceleration.

In another embodiment of the present disclosure, the receiver 201 in the terminal 200 is integrated with an OBD device. That is, the receiver 201 may be specifically a mobile communications module integrated with an OBD device, for example, a GPRS communications module integrated with an OBD device. The OBD device includes at least one of an OBD module, a GPS, and an acceleration sensor. The receiver 201 integrated with the OBD device is inserted into a specific interface of a vehicle.

The receiver 201 may directly acquire at least one piece of the following information: the vehicle speed and the rotational speed of the engine, the geographical location information, and the acceleration.

Optionally, the receiver 201 is further configured to acquire a standard that is used to analyze the driving behavior of the user and sent by the server.

Further, after the receiver 201 receives the program script sent by the server, the processor 202 may decrypt the program script by using a preset public key. If decryption is successful, it is proved that the program script is a secure program script, and may be used to analyze the driving behavior of the user. If the decryption fails, it is proved that the program script is an insecure program script and is abandoned.

Further, the processor 202 may make one copy of the program script, encrypt code in the program script by using hardware encryption or a software encryption method such as obfuscated code encryption, and store the code that is in the program script to be used in next scheduling.

Optionally, the processor 202 is specifically configured to substitute the travel data into the program script, execute the program script, and generate a first value.

The first value is compared with the standard that is used to analyze the driving behavior of the user and acquired by the receiver, and the driving behavior of the user is analyzed.

The first value may be a variance or an average.

Specifically, the processor 202 substitutes the acquired driving data into the program script sent by the server, executes the program script, and generates the first value; and then compares the first value with the standard that is used to analyze the driving behavior of the user and received by the receiver 201, where the first value may be a variance or an average.

Optionally, the processor 202 is further configured to: detect geographical location information; and when it is detected that the geographical location information changes, request the server to update the program script.

Specifically, because a method used for analyzing the driving behavior of the user is different in different countries and different provinces, program scripts used to analyze the driving behavior of the user are also different. In one case, the processor 202 detects, according to geographical location information acquired by the GPS, whether the geographical location information of the user changes. When the processor 202 detects a change in the geographical location information of the user, the processor 202 may actively request the server to update a current program script used to analyze the driving behavior of the user. When the receiver 201 receives an updated program script, the processor 202 may update an existing program script according to the received program script, so that the program script is applicable to a current geographical location, and the processor 202 analyzes the driving behavior of the user more accurately. The updating a current program script used to analyze the driving behavior of the user may be modifying the existing program script, or may be adding a new program script.

Figure 5:
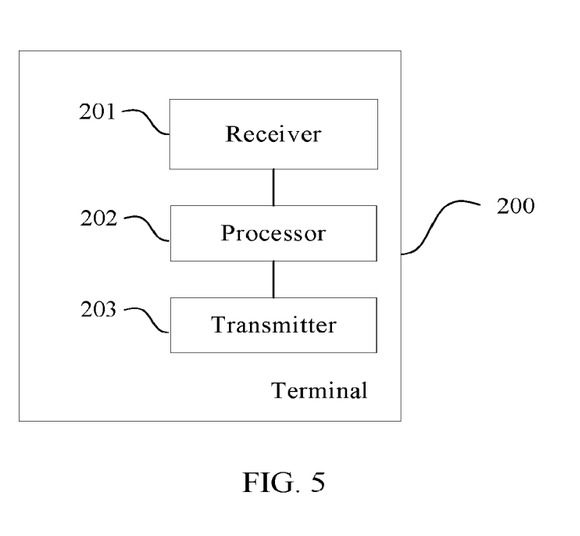
FIG. 5 is a schematic structural diagram of a terminal according to another embodiment of the present disclosure.

In addition, as shown in FIG. 5, for the terminal 200, the terminal 200 may further include a transmitter 203.

The processor 202 is further configured to collect travel data of a fixed period of time in which a vehicle travels.

The transmitter 203 is configured to send the travel data to the server.

The transmitter 203 may be specifically a mobile communications module, for example, a GPRS communications module.

In the terminal provided in this embodiment of the present disclosure, the terminal first receives a program script that is sent by a server and used to analyze a driving behavior of a user, then the terminal acquires travel data, and finally the terminal analyzes the driving behavior of the user according to the received program script and the acquired travel data. The driving behavior of the user is dynamically analyzed according to the program script and the travel data, which resolves a problem that algorithm accuracy decreases because an algorithm is not updated in time, ensures accuracy of analyzing the driving behavior of the user, and further decreases additional costs brought by updating terminal firmware.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for providing a program script to an on-board diagnostic (OBD) device inside a vehicle, the method comprising:
   receiving, by a processor of a server, a request from the OBD device for the program script that is applicable to analyzing a driving behavior of a user of the vehicle at a current geographical location of the vehicle, the program script when being executed causing the OBD device to calculate an index indicating at least one of a road danger, an accident risk, and an oil consumption estimation according to current travel data of the vehicle collected by various sensors of the OBD device; and
   in response to the received request,
      acquiring, by the processor of the server, historical travel data associated with the current geographical location of the vehicle and the user of the vehicle,
      determining, by the processor of the server, a data flow analysis function by fitting a pre-set data model to the historical travel data,
      generating, by the processor of the server, the program script applicable to the current geographical location and the vehicle according to the data flow analysis function, and
      sending the program script from the server to the OBD device.

2. The method according to claim 1,
   wherein the acquiring the historical travel data comprises:
      acquiring the historical travel data from a third-party data server; or
      acquiring the historical travel data from the OBD device,
   wherein the historical travel data is travel data corresponds to a fixed period of time.

3. The method according to claim 1, wherein after the sending the program script to the OBD device, the method further comprises:
   sending a judgement threshold corresponding to the index to the OBD device, the judgement threshold being associated with the current geographical location of the vehicle and used to distinguish whether the driving behavior is normal or not.

4. The method according to claim 1, wherein the sending the program script comprises:
   encrypting, by the processor of the server, the program script into encrypted information; and
   sending the encrypted information from the server to the OBD device.

* * * * *